(12) United States Patent
Serrano et al.

(10) Patent No.: US 7,940,615 B2
(45) Date of Patent: *May 10, 2011

(54) SINGLE PLL DEMODULATION OF PRE-FORMATTED INFORMATION EMBEDDED IN OPTICAL RECORDING MEDIUM

(75) Inventors: Louis J. Serrano, San Jose, CA (US); Shih-Ming Shih, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 363 days.

This patent is subject to a terminal disclaimer.

(21) Appl. No.: 12/173,135

(22) Filed: Jul. 15, 2008

(65) Prior Publication Data

US 2008/0273430 A1    Nov. 6, 2008

Related U.S. Application Data

(63) Continuation of application No. 11/012,529, filed on Dec. 14, 2004, now Pat. No. 7,400,561.

(51) Int. Cl.
*G11B 7/00* (2006.01)
(52) U.S. Cl. .................. 369/47.28; 369/59.2; 369/44.13
(58) Field of Classification Search .............. 369/47.28, 369/59.21, 59.2, 44.13
See application file for complete search history.

(56) References Cited

U.S. PATENT DOCUMENTS

| | | | |
|---|---|---|---|
| 5,506,824 A | 4/1996 | Fairchild et al. | 369/47.22 |
| 7,138,840 B2 | 11/2006 | Serrano et al. | 327/158 |
| 2004/0202079 A1 | 10/2004 | Oki | 369/59.2 |

*Primary Examiner* — Jorge L Ortiz Criado
(74) *Attorney, Agent, or Firm* — Christopher P. Maiorana, PC

(57) ABSTRACT

A method and apparatus demodulate pre-formatted information embedded in an optical recording medium. The demodulation includes (a) receiving a wobble signal representing data symbols frequency-modulated on a carrier frequency, (b) generating a phase delta signal representing a phase difference between the wobble signal and a corresponding locked signal having the carrier frequency, (c) first sampling the phase delta signal at a data sampling interval to produce first values, (d) second sampling the phase delta signal at each halfway of the data sampling interval to generate second values, (e) determining, based on a difference between two successive second values, if the first sampling is performed at timing corresponding to an end of each data symbol, and (e) adjusting sampling timing of the first sampling towards the timing corresponding to each end of the data symbols, if the sampling timing does not corresponds to the end of each data symbol.

20 Claims, 13 Drawing Sheets

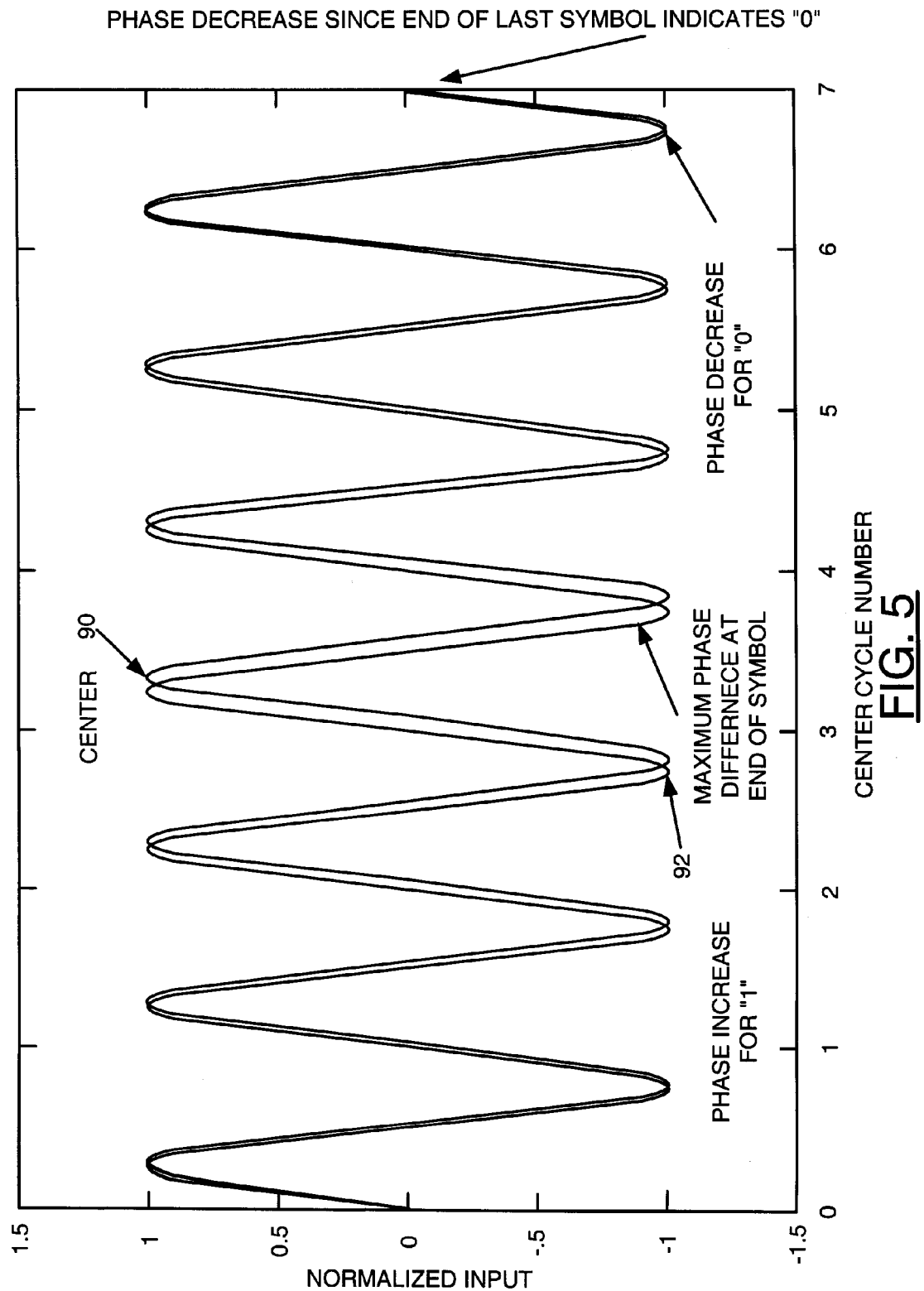

SINGLE PLL DEMODULATION OF PRE-FORMATTED INFORMATION EMBEDDED IN OPTICAL RECORDING MEDIUM

This is a continuation of U.S. Ser. No. 11/012,529, filed Dec. 14, 2004, now U.S. Pat. No. 7,400,561 which is incorporated by reference in its entirety.

FIELD OF THE INVENTION

The present invention relates to optical disc systems. More particularly, the present invention relates to timing control in demodulation and writing data onto recordable optical discs.

BACKGROUND OF THE INVENTION

In a read-only optical recording medium, such as a compact disc (CD) read only memory (ROM) or digital versatile disc (DVD) ROM, user data is built into the disc and also provides position and timing information for reading the data. However, in a recordable CD or DVD, such position and timing information must be provided without user data. Thus, recordable CDs or DVDs are manufactured with preformatted land-groove patterns in order to encode position and timing information. Fine position information comes from the "push-pull" signal arising from the presence of the alternating land and groove patterns. Timing information, which is used to write the user data at a precise circumferential location of the groove, is provided by "wobbling" the grooves. Coarse position information is encoded in the wobble, or on the land adjacent to the groove, depending on the format. The optical disc driving system recovers the position and timing information from the preformatted patterns using a timing loop. The exact method of information recovery depends on the precise format of the recordable CD or DVD.

There are various types and formats of recordable optical discs, for example, CD-R (recordable), CD-RW (rewriteable), DVD-R (recordable), DVD+R, DVD-RW, DVD+RW, and the like. DVD-R and DVD-RW use preformatted pits on the land adjacent to the track to provide the position information, and the groove is wobbled at fixed frequency to provide the timing information. The timing information is used to generate a write clock. On the other hand, DVD+R and DVD+RW encode the position data using a single cycle Binary Phase Shift Keying (BPSK) modulation on the wobble, so that a small set of the wobble cycles are opposite in phase to the rest. The remaining cycles form a constant frequency sinusoid similarly to DVD-R/RW, and provide timing information for the write clock. On the other hand, CD-R and CD-RW use frequency modulation (FM) to encode a bit stream containing sync information and data block number. Consequently, the wobble signal from a recordable CD takes two values centered on the desired wobble frequency (the carrier frequency).

In order to recover these preformatted timing and position information (also referred to as wobble data), a timing loop is conventionally used in CD-recordable and DVD-recordable chip sets. FIG. 1 schematically illustrates a conventional timing loop 10. The timing loop 10 typically includes a phase detector 12, a loop filter 14, and a Voltage Controlled Oscillator (VCO) 16. The timing loop 10 is commonly referred to as a phase lock loop (PLL). The recording system for either format is required to have an accurate timing loop to demodulate the encoded coarse position information and properly align the write data with the wobble. A DVD-recordable system only requires one timing loop because, in a DVD-recordable format, the timing information is provided by the wobble with a fixed frequency and thus the wobble data is synchronous with the timing wobble signal. However, in a CD-recordable format which uses frequency modulation of the carrier signal, the wobble data is modulated onto the wobble signal somewhat asynchronously. Thus, a CD-recordable system requires two different timing loops: one for the wobble signal; and the other to determine when to sample the wobble data. That is, in a CD-recordable system, after a timing loop (phase lock loop) is locked to the underlying wobble frequency and phase, it is still necessary to determine when to sample the resulting signal to obtain the wobble data. In addition, the Applicants have found that there is sometimes a frequency offset between the underlying wobble frequency and the wobble data due to manufacturing error or process deviation and the like, and the best time to sample the resulting signal would change with time. In this case there is an additional concern that the data should be placed on the disc with respect to the wobble data, rather than the wobble signal, in order to avoid an overwriting of the user data or a gap in the user data.

FIG. 2 schematically illustrates a conventional two-PLL system 20 for a CD-recordable format, including a first PLL 22 for a wobble signal, and a second PLL 24 for the wobble data. The output of the wobble signal PLL 22 reflects the underlying frequency modulation (wobble phase output), which is used as an input to the second PLL 24. For example, in the second PLL 24, the wobble phase output may be high-pass filtered to remove any DC content, and then squared to remove the effect of the sign of the signal. The output of the second PLL 24 will be used as a clock to sample the input signal, and from these samples, the signal can be demodulated. Thus, the arbitrary phase offset and any possible frequency offsets are eliminated by the second PLL 24.

However, compared with a DVD-recordable system, the conventional two-PLL CD-recordable system has disadvantages that it requires additional circuitry for the second PLL, which increases the size and cost of the device. In addition, the presence of multiple circuits with the same function increases the design complexity, as well as the pin count of the chip, the number of components required to support the chip, and the like.

BRIEF DESCRIPTION OF THE INVENTION

A method and apparatus demodulate pre-formatted information embedded in an optical recording medium. The demodulation includes (a) receiving a wobble signal, the wobble signal represents data symbols which are frequency-modulated on a carrier frequency of a pre-formatted pattern of the recording medium, (b) generating a phase delta signal representing a phase difference between the wobble signal and a corresponding locked signal having the carrier frequency, (c) first sampling the phase delta signal at a data sampling interval so as to produce first values of the phase delta signal, (d) second sampling the phase delta signal at each halfway of the data sampling interval so as to generate second values of the phase delta signal, (e) determining, based on a difference between two successive second values, if the first sampling is performed at timing corresponding to an end of each data symbol, and (e) adjusting sampling timing of the first sampling towards the timing corresponding to each end of the data symbols, if the sampling timing does not corresponds to the end of each data symbols.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIG. 5 is a diagram schematically illustrating an example of CD-R/RW modulation scheme using Continuous Phase Frequency Shift Keying (CPFSK).

DETAILED DESCRIPTION

Figure 1:
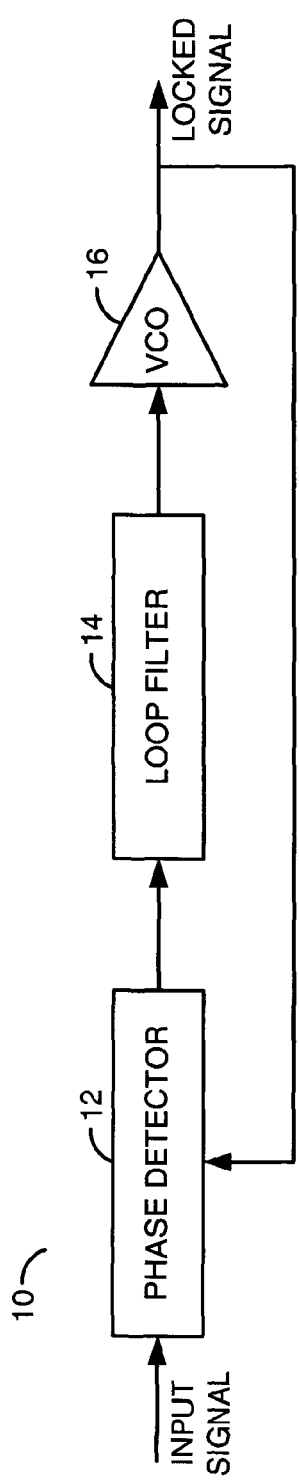
FIG. 1 is a blocks diagram schematically illustrating a conventional timing loop.
Figure 2:
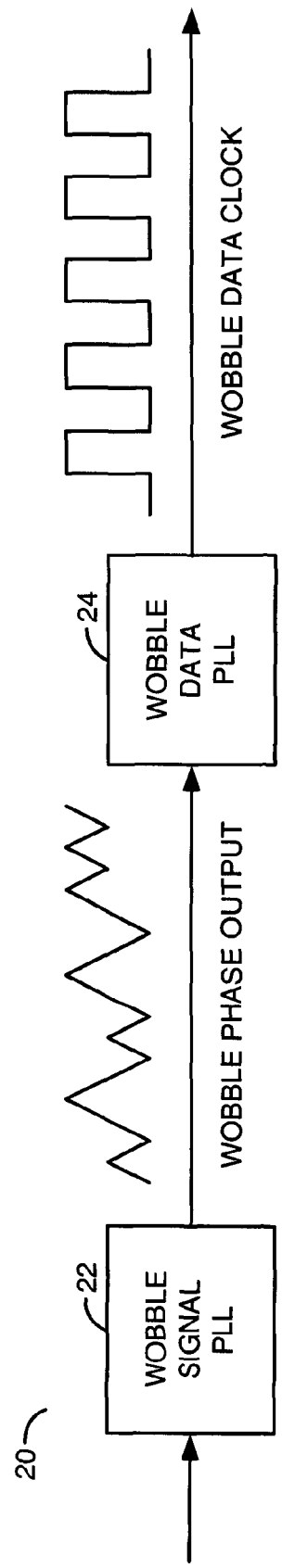
FIG. 2 is a block diagram schematically illustrating a conventional two-PLL system for a CD-recordable format, including a first PLL for a wobble signal and a second PLL for the wobble data.

Embodiments of the present invention are described herein in the context of a single PLL demodulation of pre-formatted information embedded in an optical recording medium. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific coals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with one embodiment of the present invention, the components, process steps, and/or data structures may be implemented using various types of operating systems (OS), computing platforms, firmware, computer programs, computer languages, and/or general-purpose machines. The method can be implemented as a programmed process running on processing circuitry. The processing circuitry can take the form of numerous combinations of processors and operating systems, or a stand-alone device. The process can be implemented as instructions executed by such hardware, hardware alone, or any combination thereof. The software may be stored on a program storage device readable by a machine.

In addition, those of ordinary skill in the art will recognize that devices of a less general purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

As described above, since DVD wobble data is synchronous to the wobble signal for all recordable formats, locking the PLL to the wobble signal is sufficient to permit the demodulation of the wobble data. However, recordable CD formats are somewhat different and the wobble signal is asynchronously modulated. That is, the phase of the wobble signal at which the modulation occurs is arbitrary, and it is even possible for a slight frequency offset between the wobble data and wobble signal. Normally, there are 7/2 cycles at the unmodulated wobble frequency (i.e. the carrier frequency) per wobble data symbol (channel bit), but due to offsets between the wobble signal clock and wobble data clock, the actual rate may be slightly different. In accordance with one embodiment of the present invention, this arbitrary phase offset is removed as much as possible to improve the signal-to-noise ratio (SNR) in demodulation of the wobble data, and the VCO can also be adjusted if there is a frequency offset between the wobble data and wobble signal. The wobble data is also referred to as Absolute Time in Pregroove (ATIP).

Figure 3:
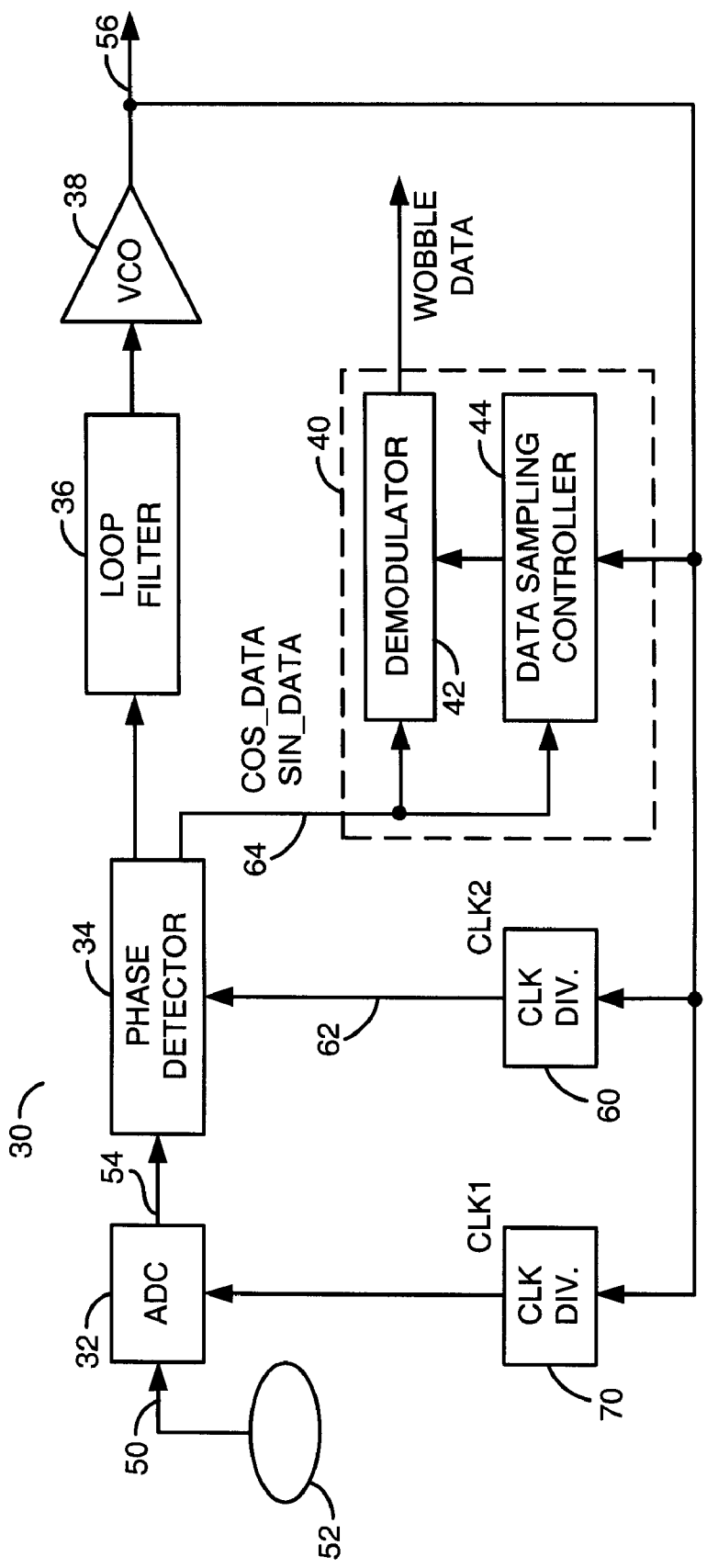
FIG. 3 is a block diagram schematically illustrating a demodulation system in accordance with one embodiment of the present invention.

FIG. 3 schematically illustrates a demodulation system 30 in accordance with one embodiment of the present invention. The demodulation system 30 is used to demodulate pre-formatted information embedded in an optical recording medium such as a CD. For example, the pre-formatted information may be a wobble signal representing data symbols which are frequency-modulated on a carrier frequency of a pre-formatted pattern (wobble) of the recording medium. As shown in FIG. 3, the demodulation system 30 includes an analog-to-digital (A/D) converter 32, a phase detector 34, a loop filter 36, a voltage-controlled oscillator (VCO) 38, and a timing/demodulation circuit 40. The timing/demodulation circuit 40 includes a demodulator 42 and a data sampling controller 44.

The A/D converter 32 samples, at an A/D sampling interval (A/D sampling timing), an analog wobble signal 50 read from the recording medium 52 and generates a wobble signal 54. The phase detector 34 is coupled to the A/D converter 32, and extracts a relative phase between an output of the VCO 38 and the wobble signal 54. The output of the VCO 38 is a locked signal 56, which is used as a write clock. The write clock may be supplied through a clock divider 60 such that the input to the phase detector 34 is a locked signal 62 having the carrier frequency of the wobble of the recording medium. The phase detector 34 venerates a phase delta signal 64 representing a phase difference between the wobble signal 54 and the locked signal 62. The loop filter 36 is also coupled to the phase detector 34. The loop filter 36 is typically an analog filter and receives an output from the phase detector 34 via a digital-analogue (D/A) converter (not shown in FIG. 3). The loop filter 36 governs the speed of the VCO output, and a higher bandwidth thereof provides fast reaction of the timing loop, while a lower bandwidth thereof provides less noise of the system.

The demodulator 42 is coupled to the phase detector 34, and extract encoded position information. The demodulator 42 samples the phase delta signal 64 at a data sampling interval in accordance with a data sampling clock (data sampling timing) and generates first values of the phase delta signal 64. The first values (sampled data) are output as a data signal (wobble data). The data sampling controller 44 samples the phase delta signal 64 at each halfway of the data sampling interval (phase monitoring timing) and generates second values of the phase delta signal. The data sampling controller 44 monitors a difference between two consecutive second values, and determines, based on the difference, if the demodulator 42 is performing its sampling at the timing corresponding to each end of the data symbols. The difference under certain circumstances indicates timing error of the data sampling timing with respect to the symbol. If the sampling timing of the demodulator 42 does not corresponds to each end of the data symbols (timing error), the data sampling controller 44 adjusts the sampling timing of the demodulator towards the timing corresponding to each end of the data symbols. For example, the sampling timing is advanced or delayed while maintaining the same data sampling interval.

Figure 4:
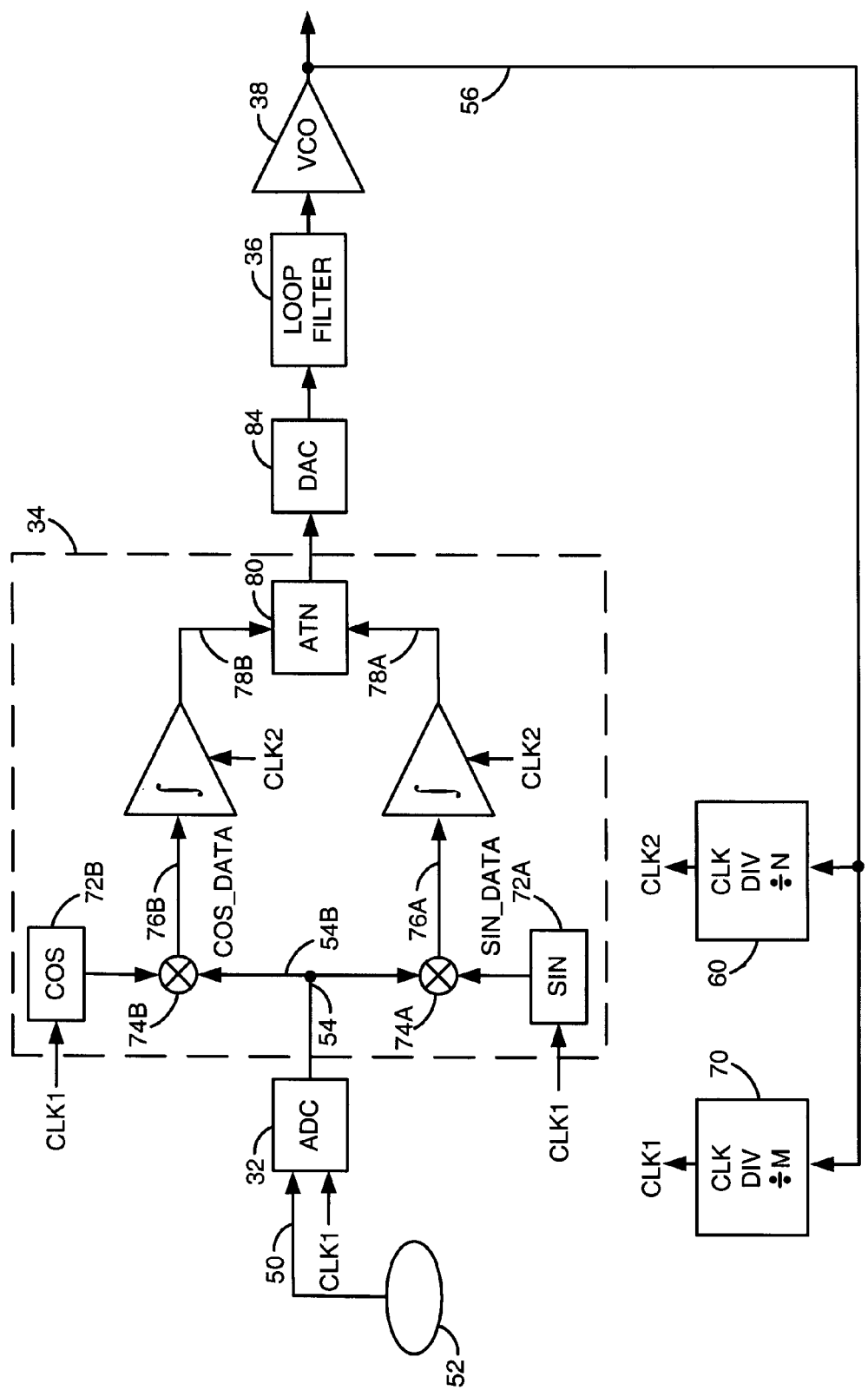
FIG. 4 is a block diagram schematically illustrating a PLL portion of the demodulation system for initially locking the timing loop to the wobble of the recording medium.

FIG. 4 schematically illustrates the PLL portion of the demodulation system 30 used when initially locking the timing loop to the wobble of the recording medium. The like elements are denoted by the like numeral references in FIGS. 3 and 4. Typically, in this initial locking, the timing/demodulation circuit 40 is turned off. The sampling time of the A/D converter 32 (with the A/D sampling interval) is driven by the VCO 38. The VCO output (write clock) 56 is divided by M in a clock divider 70 and input to the A/D converter 32, where number M is format dependent. The write clock 56 is also divided by N in the clock divider 60 and input to the phase detector 34. As shown in FIG. 4, in the phase detector 34, the output 54 of the A/D converter 32 is branched into a first branch 54a and a second branch 54b. The first branch 54a is multiplied by a sine vector 72a at a first multiplier 74a so as to produce a sin_data signal 76a. Similarly, the second branch 54b is multiplied by a cosine vector 72b at a second multiplier 74b so as to produce a cos_data signal 76b. After integration for one cycle, the output 78a of the first branch is cos θ, while the output 78b of the second branch is sin θ. Taking the arctangent at an arctangent block 80 yields θ, which is the phase error between the wobble signal 54 and the VCO clock. The phase error signal 82 is input to the VCO 38 via a digital-analog (D/A) converter 84 and the loop filter 36, and used to adjust the VCO 38 to align its output with the wobble signal 54. It should be noted that the demodulation system can be made compatible to other recording formats, for example, a DVD+R, by making numbers M and N programmable.

FIG. 5 schematically illustrates an example of CD-R/RW modulation scheme using Continuous Phase Frequency Shift Keying (CPFSK), where the carrier 90 is encoded by changing its frequency into a modulated wobble 92. For example, the carrier wobble frequency is 22.05 KHz ($f_o$), and channel bit "1" is encoded as 22.05 KHz+1 KHz ($f_o+\Delta f$) and channel bit "0" is encoded as 22.05 KHz−1 KHz ($f_o-\Delta f$). Two channel bits represent one wobble data bit (i.e., "bi-phase mark"), and there is always a channel bit transition between the wobble data bits. The violation of this transition rule is used as sync marks. In this example, wobble data bits are encoded such that wobble data bit "1" has a transition between its two channel bits (i.e., channel bits pair "1-0" or "0-1"), and wobble data bit "0" does not (i.e., channel bit pair "1-1" or "0-0"). FIG. 5 shows wobble data bit "1" (i.e., two channel bits "1-0") encode in the wobble, where seven (7) carrier cycles are used to encode one wobble bit, with three and a half carrier cycles for each channel bit. As shown in FIG. 5, the phase of the wobble signal increases during about three and a half cycles, representing channel bit "1", and then the phase decreases during another three and a half cycles, representing channel bit "0". In other words, about 3.5 cycles of the wobble signal with an increasing phase represents encoded symbol "1" and about 3.5 cycles of the wobble signal with a decreasing phase represents encoded symbol "0". Thus, in FIG. 5, the maximum phase difference between the wobble and the carrier is seen at the end of symbol "1", and a zero phase difference is seen at the end of symbol "0". In the ideal case where data sampling is perfectly synchronized with the modulation, the wobble signal is sampled at the end of each symbol so as to produce three values: the maximum phase difference in either sign (plus or minus) and a zero.

Figure 6A:
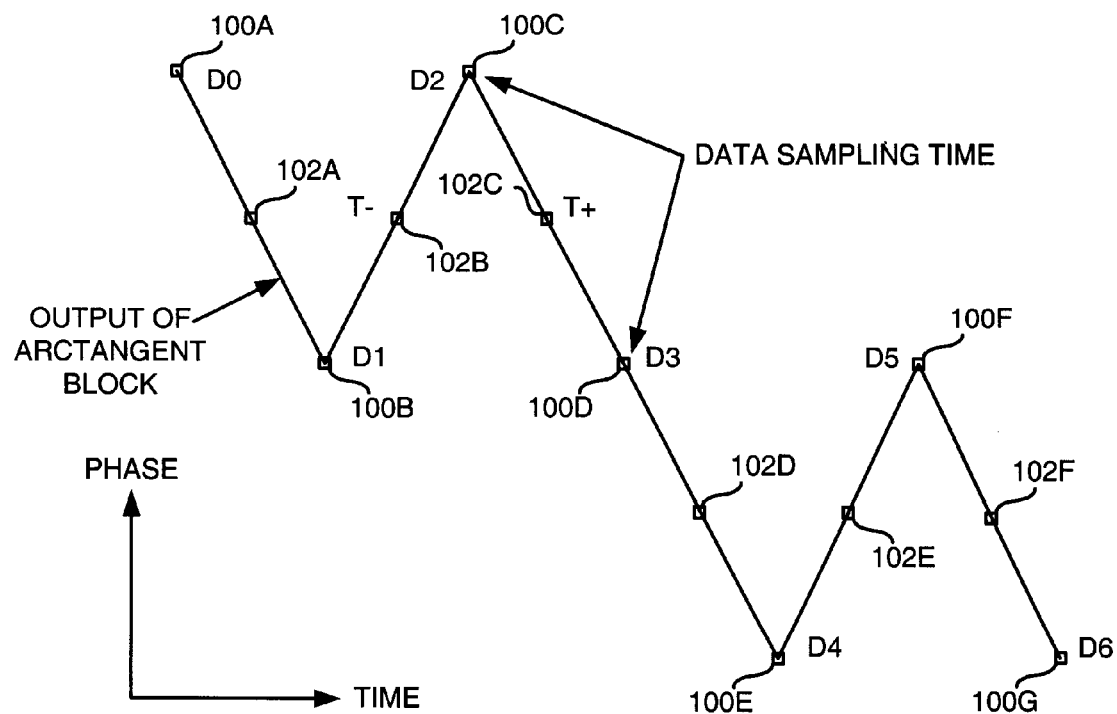
FIG. 6A is a diagram schematically illustrating demodulation of the wobble data in the ideal case of continuous time and perfect synchronization in accordance with one embodiment of the present invention.

FIG. 6A schematically illustrates demodulation of the wobble data in the ideal case of continuous time and perfect synchronization in accordance with one embodiment of the present invention. The VCO output is locked to the carrier frequency $f_o$. In FIG. 6A, each square (□) represents the data sampling point (data sampling time) 100 (100a, 100b, ...), and the sampled data D0 through D6 are shown. When the wobble signal is modulated with symbol "0" it becomes a sinusoid with frequency $f_o-\Delta f$, and its phase (as determined at the output of the arctangent block 89 in FIG. 4) will decrease linearly with time relative to the VCO frequency of $f_o$. The absolute value, however, can be offset by an arbitrary constant. For example, the phase (phase delta θ) decreases from D0 to D1, meaning the underlying symbol (the channel bit) of D0 is "0". At the end of the symbol (100b), the modulation for the next wobble symbol changes to "1", and the wobble signal is now a sinusoid with frequency $f_o+\Delta f$. The phase output by the arctangent block (which is the relative phase between the two signals) increases linearly with time to the end of the second wobble symbol (D1). Thus, when the underlying symbol changes, there is a "peak" in the phase delta diagram. The third and fourth symbols (D2 and D3) are both "0", and thus there is no "peak" in this symbol transition. However, the fifth symbol (D4) is again "1", so that the phase increases to a peak where the sixth symbol (D5), which is "0", commences.

Although the diagram in FIG. 6A is illustrated as a continuous curve, in order to demodulate the data, it is not necessary to generate all the points on this curve. For data demodulation purposes it is sufficient to sample the phase at the end of the wobble symbol (as represented by the squares □). To determine the underlying data (symbol or channel bit), the sign of the difference between two successive phase measurements (the sampled phase data) indicates the modulated data value. For example, since D1 is smaller than D0 (i.e., D0−D1<0), the symbol for D0 must be a zero ("0") to cause the decrease in phase. Similarly, since D2 is greater than D1 (D2−D1>0), the symbol for D1 must be a one ("1") to cause the increase in phase. The other symbols can likewise be found. Thus, in this example, the underlying symbols (channel bits) are: "0", "1", "0", "0" "1", "0", and the corresponding wobble data are: (0,1), (0,0), (1,0), i.e., the wobble data bits "1", "0", "1". It should be noted that this demodulation scheme does not depend on the value of $\Delta f$. That is, a larger modulation index may improve the SNR of the demodulation scheme, but otherwise demodulation is independent of it.

Figure 6B:
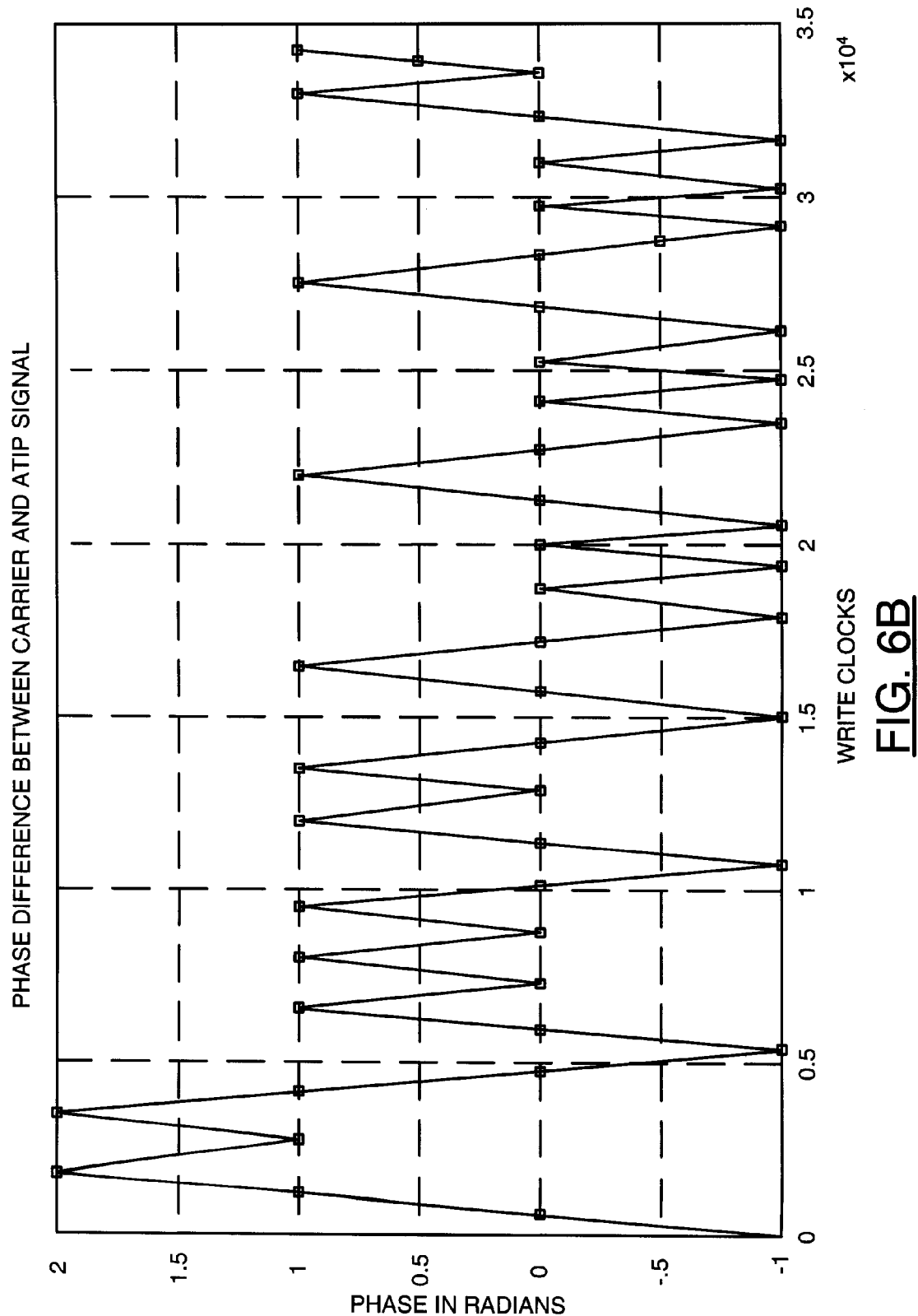
FIG. 6B is a diagram schematically illustrating an example of plotted phase difference between the carrier and the wobble signal in the ideal synchronization in accordance with one embodiment of the present invention.

FIG. 6B schematically illustrates an example of plotted phase difference between the carrier and the wobble signal in the ideal synchronization in accordance with one embodiment of the present invention. The wobble data causes the phase difference between the carrier and the wobble signal. If the VCO 38 is phase locked to the carrier, the line of the graph represents the phase difference (phase delta θ in radian in FIG. 6B) which is the output of the arctangent block in the demodulator circuit. Similarly to FIG. 6A, the squares represent the end of each symbol (each channel bit). As described above, the channel bit one ("1") causes the phase to increase and channel bit zero ("0") causes the phase to decrease. Thus, the channel bits in FIG. 6B can be read off as 1, 1, 1, 0, 1, 0, 0, 0 (this is the sync mark), followed by 1, 1 (i.e., wobble data bit 0), 0, 1 (i.e., wobble data bit 1), 0, 1 (i.e., wobble data bit 1) and so on.

Thus, with perfect synchronization between the PLL, wobble signal, and wobble data, demodulation is very simple. However, there is an arbitrary phase offset between the wobble signal and wobble data, so that even if they are locked in frequency and the wobble signal is locked to the VCO, the proper sampling time is unknown. To solve this problem, a phase monitor (timing measurement) and window move mechanism are used in accordance with one embodiment of the present invention. As shown in FIG. 6A, the phase delta is not only sampled at the data sampling points 100, but also sampled at phase monitoring points 102 (102a, 102b, . . . ) which are halfway between the corresponding data sampling points 100. When data sampling is ideally in synchronization, the values ($T_1$ and $T_0$) of two successive phase monitoring points 102b and 102c on the both sides of (i.e., before and after) a "peak" 100c are equal. For example, when the data sampling points 100b and 100c are both at a "peak," the value of the phase monitoring points 102a, 102b, and 102c are all the same. It should be noted that a "negative" peak such as D1 (100b) means that the underlying symbols changes from "0" to "1", and a "positive" peak such as D2 (100c) means that the underlying symbols changes from "1" to "0". Furthermore, if there is no peak between two successive phase monitoring points, the difference between the values $T_n$ and $T_{n-1}$ has no indication.

Figure 7:
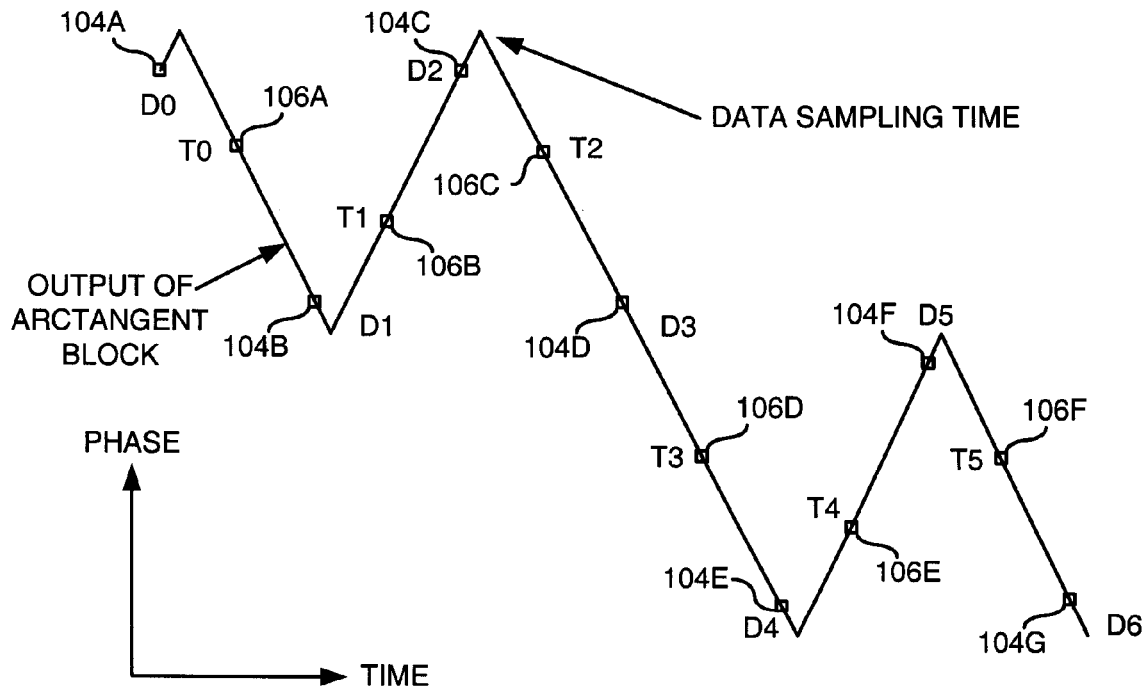
FIG. 7 is a diagram schematically illustrating an example where the data samples are taken too early and the data sampling points do not match the end of the symbols.

FIG. 7 schematically illustrates an example where the data samples are taken too early and the data sampling points 104 (104a, 104b, . . . ) do not match the end of the symbols. Thus, the value $T_2$ (at phase monitoring point 106c) is larger than value $T_1$ (at the phase monitoring point 106b), for example. The difference between these two phase monitoring points is detected in the data sampling controller 44 (FIG. 3) and used to adjust the data sampling times.

Figure 8:
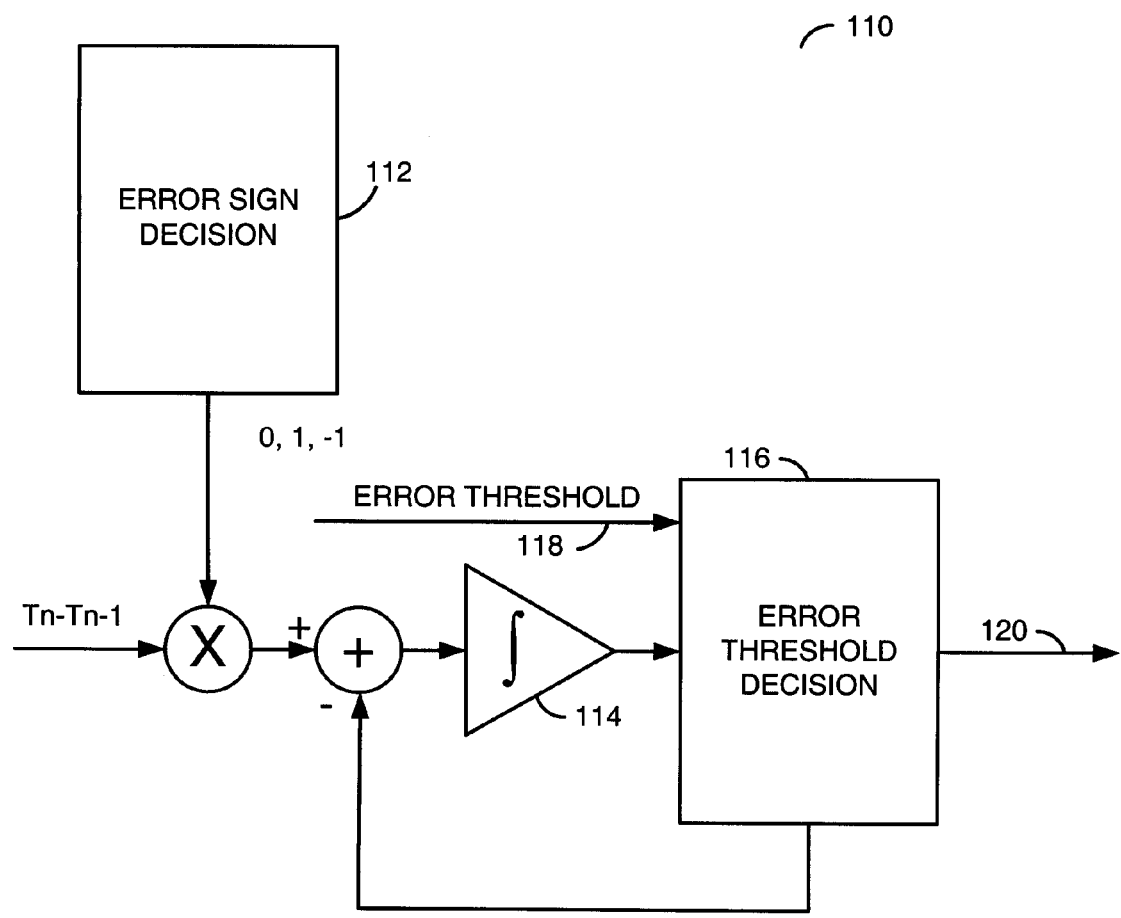
FIG. 8 is a block diagram schematically illustrating a phase error detector circuit in the data sampling controller in accordance with one embodiment of the present invention.

FIG. 8 schematically illustrates a phase error detector circuit 110 in the data sampling controller 44 in accordance with one embodiment of the present invention. The input to the circuit 110 is the difference between the values $T_n$ and $T_{n-1}$ (n=1, 2, . . . ) sampled at two successive phase monitoring points before and after a peak. Since the sign of the difference depends on the orientation of the curve as shown in FIG. 7, a proper sign is determined for each difference by an error sign decision block 112. For negative peaks, such as D1 and D4, the difference must be negated. In the absence of a peak, for instance, the sequence form D2, D3, and D4 (i.e., no peak at the data sampling point 104d), the value $T_3-T_2$ is zeroed (i.e., discard). At the positive peaks such as D2 and D5, a positive sign is assigned to the difference. Thus, the output of the error sign decision block 112 is a value of 0, 1, or −1.

The sign-assigned difference ($T_n-T_{n-1}$) represents the data-sampling timing error with its direction (too soon or too late), and the difference is accumulated using an accumulator 114 until the total value exceeds a threshold value. As shown in FIG. 8, an error threshold decision block 116 compares the accumulated difference with a given error threshold value 118, and if the accumulated difference exceeds the threshold, the decision block 116 issues an adjustment signal 120. Since the amount of each phase difference may be small, and also the difference is taken only when a peak exists between two phase monitoring points, accumulating the difference can eliminate its symbol data dependency and also allow the adjustment in a stable manner. In accordance with the adjustment signal 120, the data sampling time and the phase monitoring time are both adjusted by a predetermined time period. The accumulator 114 may be reset when the adjustment is done. The predetermined time period may be one cycle of A/D sampling clock. Here, the A/D sampling clock is the output of the clock divider 70 (FIGS. 3 and 4), where the analog wobble signal 50 is sampled in accordance with this clock (CLK1) to produce corresponding digital values of the wobble signal 54. In this example, the analog wobble signal is A/D sampled every seven (7) write clock (the VCO output 56) cycles, which means that there would be 28 A/D sampled values per nominal wobble cycle, and 98 A/D sampled values per symbol. That is, in FIG. 8, there would be 98 A/D sampled values between two data sampling points 100.

Figure 9:
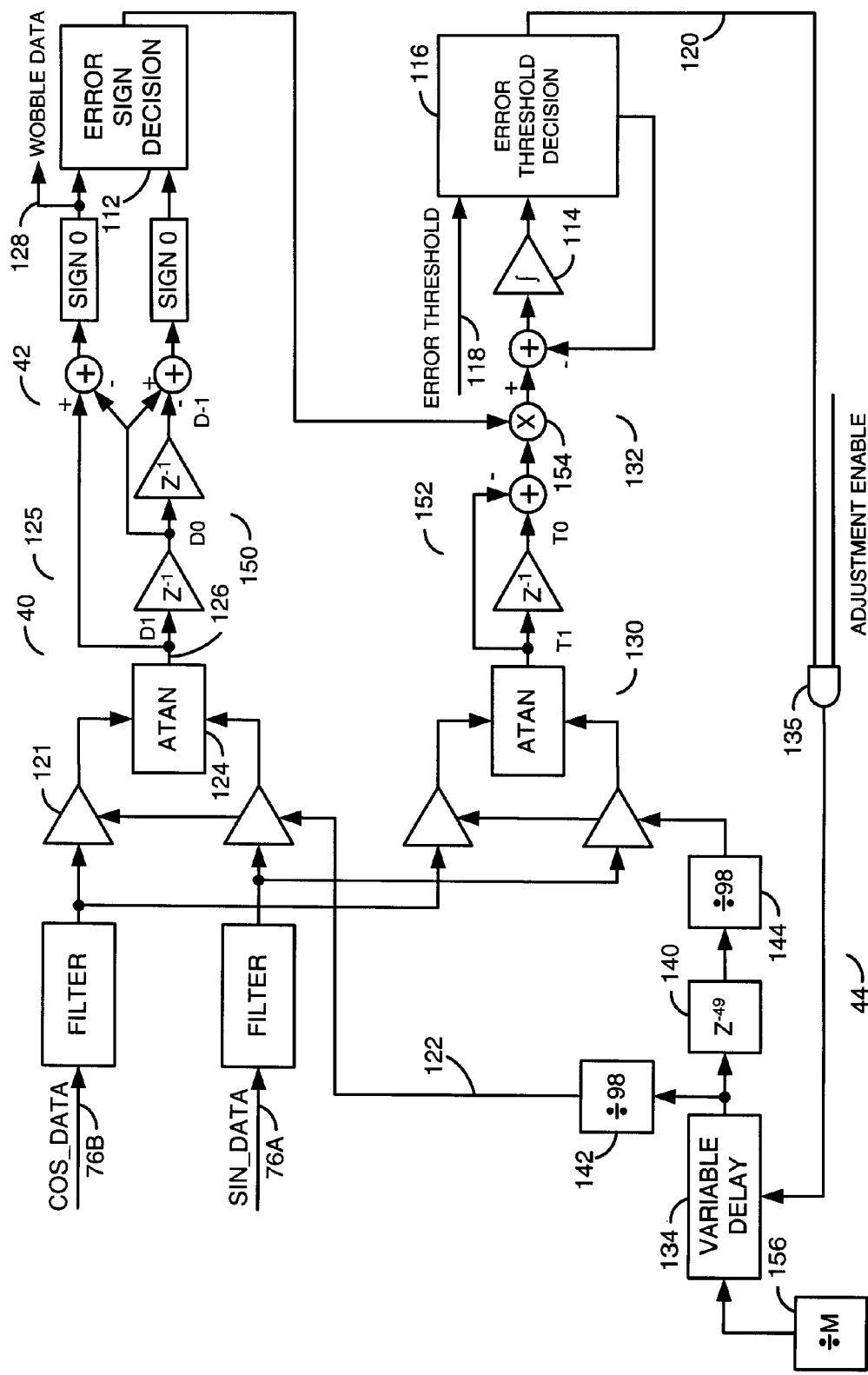
FIG. 9 is a block diagram schematically illustrating an example of the timing/demodulation circuit including the demodulator and the data sampling controller in accordance with one embodiment of the present invention.

FIG. 9 schematically illustrates an example of the timing/demodulation circuit 40 including the demodulator 42 and the data sampling controller 44 in accordance with one embodiment of the present invention. The inputs to the timing/demodulation circuit 40 are the outputs 76a and 76b of the multipliers 74a and 74b in the phase detector 34 (FIG. 4). These inputs may be digitally filtered in order to eliminate the second order terms, as shown in FIG. 9, using variable bandwidth digital filters, for example. The sin_data signal 76a and the cos_data signal 76b may correspond to the phase delta signal 64 in FIG. 3. A shown in FIG. 9, the modulator 42 includes a sampling circuit 121, an arctangent block 124, and a circuit 125 for determining the difference between two successive sampled data values ($D_n$ and $D_{n-1}$). The sampling circuit 121 samples the phase difference between the locked signal (the career frequency) and the wobble signal every 98th A/D cycle in accordance with the data sampling clock 122 in a similar manner as that in the phase detector 34. Thus, the outputs 126 of the arctangent block 124 correspond to the sampled data D0, D1, etc. in FIG. 6A. From the difference between the successive sampled data values and the sign thereof, which represents the corresponding channel bits as described above, the wobble data 128 is determined and output from the modulator 42.

As shown in FIG. 9, the data sampling controller 44 includes a phase monitor 130, a phase error detector 132, and a timing adjustor 134. The data sampling controller 44 also receives and samples the outputs 76a and 76b of the multipliers 74a and 74b from the phase detector 34, but the timing to extract the phase difference is one-half channel bit shifted from the data sampling timing of the modulator 42. That is, the phase monitor 130 samples the phase delta signal at each halfway of the data sampling interval. i.e. on either side of the peaks, and generates the phase difference $T_0$, $T_1$, etc., as shown in FIGS. 6 and 7. In the case where the modulator 42 samples the phase difference every 98 A/D sampling cycles (using a clock divider 142), the data sampling controller 44 also samples the phase difference every 98 A/D sampling cycles (using a clock divider 144) but with 49 A/D sampling cycles delayed (using a delay block 140).

The error detector 132 corresponds to the above-described error detector circuit 110 (FIG. 8), and the like elements are denoted by the like numeral references. As shown in FIG. 9, the error detector 132 includes an error sign detection block 112, an error threshold decision block 116, first circuit blocks 150 for determining the existence of a peak (described above), and second circuit blocks 152 for calculating the difference between two successive phase differences $T_n$, and $T_{n-1}$ (n=1, 2, . . . ). It should be noted that, as shown in FIG. 9, part of the first circuit blocks 150 of the data sampling controller 44 can also be used as the circuit 125 for the modulator 42. The phase difference (at the phase monitoring point) calculated by the circuit 15' is multiplied at a multiplier 154 by a corresponding sign (+1, 0 or −1) determined by the error sign decision block 112.

If the difference between two consecutive phase differences $T_n$ and $T_{n-1}$ (on either sides of a peak) has a non-zero value, it indicates that the data sampling of the phase delta signal by the demodulator 42 is not performed at the timing corresponding to the end of each data symbol (i.e., the data sampling timing is not synchronized to symbols). Such non-zero values are accumulated by the accumulator 114, and when the error threshold decision block 116 determines that the accumulated value exceeds the threshold value 118, the adjustment signal 120 is issued to the timing adjustor 134.

The adjustment signal 120 may be a delay signal, and the timing adjustor 134 adjusts the data sampling timing in the modulator 42 (and also the phase monitoring timing in the data sampling controller 44) towards the timing corresponding to each end of the symbols, by delaying or advancing the sampling timing. For example, such delay or advance may be for one A/D sampling cycle, as described above. This adjustment operation is referred to as a "window move" operation, since the data sampling timing is shifted while maintaining the data sampling interval similarly to sliding a data sampling window. To delay the window, in the example above, the data sampling is performed after 99 A/D samples, while advancing the window would entail sampling the data after 97 A/D samples. After the window is properly moved such that the data sampling timing becomes synchronized with the end of each symbol, the window move operation may be disabled using an enable/disable circuit 135. For example, the adjustment signal 120 may be enabled when an adjustment enable signal is asserted.

As shown in FIG. 9, the timing adjustor 134 may include a clock divider 156 coupled to the VCO 38 (FIG. 3) to divide (by seven in this example) the write clock to generate the same clock as the A/D sampling clock. It should be noted that the clock divider 156 may be implemented with the clock divider 70 which provides the A/D sampling clock for the A/D controller 32. In addition, the timing adjuster 134 may also implement the first clock divider 142 which provides the data samplings clock for the modulator 42, and the second clock divider 144 and the delay block 140 which provide the phase monitoring clock for the phase monitor 130 as its part.

Figure 10:
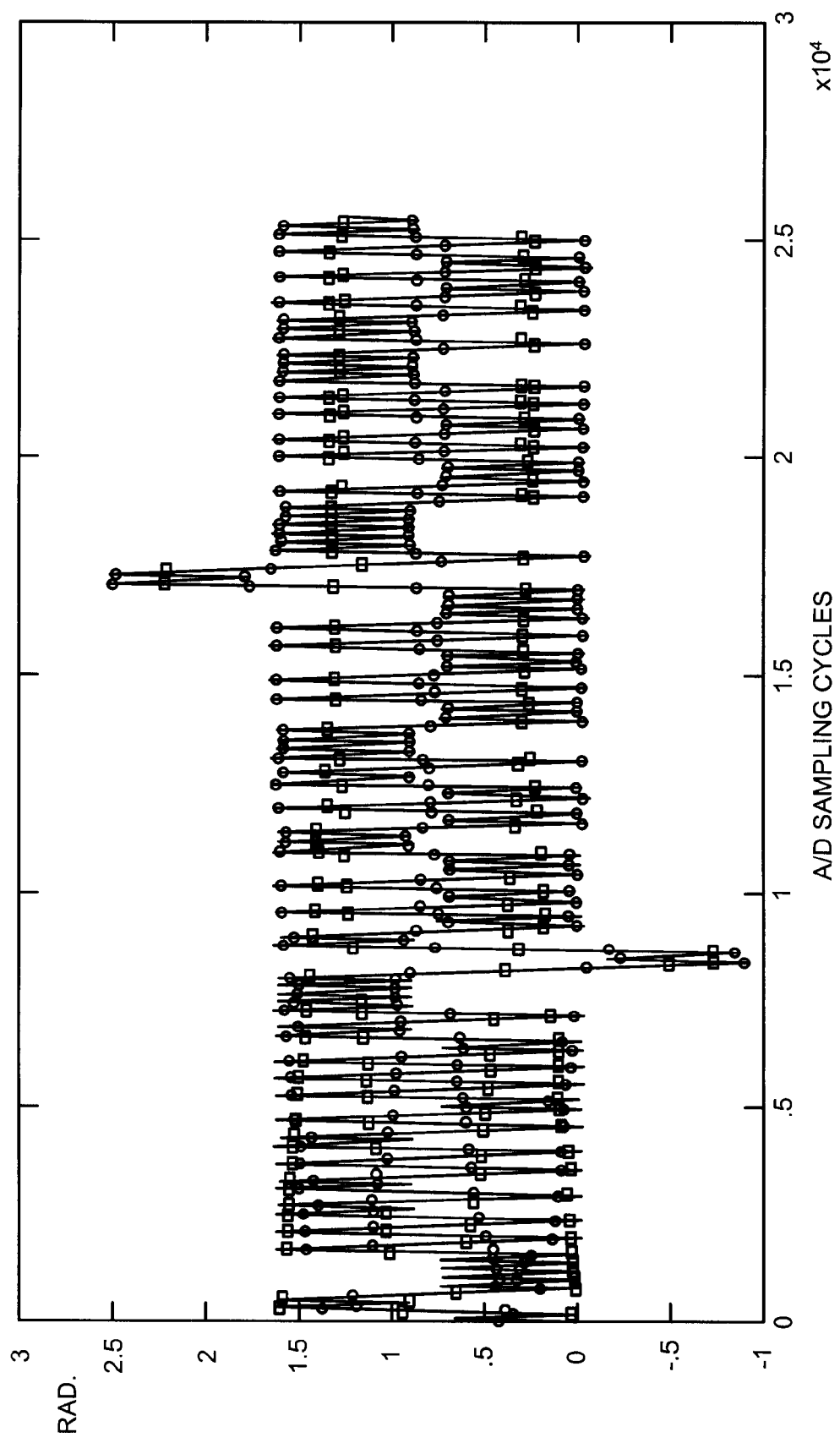
FIG. 10 is a diagram schematically illustrating convergence of the data sampling time during the window move in accordance with one embodiment of the present invention.

FIG. 10 schematically illustrates convergence of the data sampling time during the window move in accordance with one embodiment of the present invention. As described above, the goal is to sample the phase delta signal at the peaks corresponding to the end of each symbol. In FIG. 10, the squares show where the phase difference (i.e., the timing information) is monitored and sampled to control the window move, while the circles show where the phase difference is sampled for demodulation of the wobble data. As time passes, the window is moved so that the data sample (circles) occur on the peaks, and the sampling time for the data successfully converges to the peaks. After the appropriate window is determined, the window move operation may be disabled and the data sampling would ideally continue synchronized with the symbol ends.

If the wobble data (ATIP) and wobble signal do have a frequency ratio of 7/2 (in this example), the window will only move due to noise after the optimal window is found. If, however, the actual frequency ratio is not exactly 7/2 for some reasons due to manufacturing process or otherwise, the window will drift. Such) a systematic drift due to a frequency offset between the wobble data and the underlying wobble signal (wobble itself) is sometimes observed. Thus, although the window move operation can adjust quickly enough such that data demodulation will not be compromised, the user data may not be accurately written relative to the wobble data. Since the VCO will stay locked to the wobble signal, the user data will drift relative to the wobble data, and the window move operation will not compensate for this. For example, the starting location on the recording medium for writing user data is first determined from the wobble data, and then writing is started. However, if the wobble data and the wobble signal drift apart at the end of the write operation, the actual finishing location on the recording medium is different from what the wobble data indicates that it should be. When a second write operation starts and the starting point of the second write is determined relative to the wobble data instead of the actual end of the first write (wobble location), there will be a gap from the location where the first write operation left off, or the data written by the first write will be overwritten by the second write.

Thus, once the window move is complete and the demodulation window is fixed, the above-described phase monitoring may be continued to adjust such a frequency offset between the wobble data and the wobble, in accordance with one embodiment of the present invention. The timing information obtained in the data sampling controller 44 reflects this drift and can be used to adjust the PLL by controlling the A/D converter 32 instead of moving the window.

Figure 11:
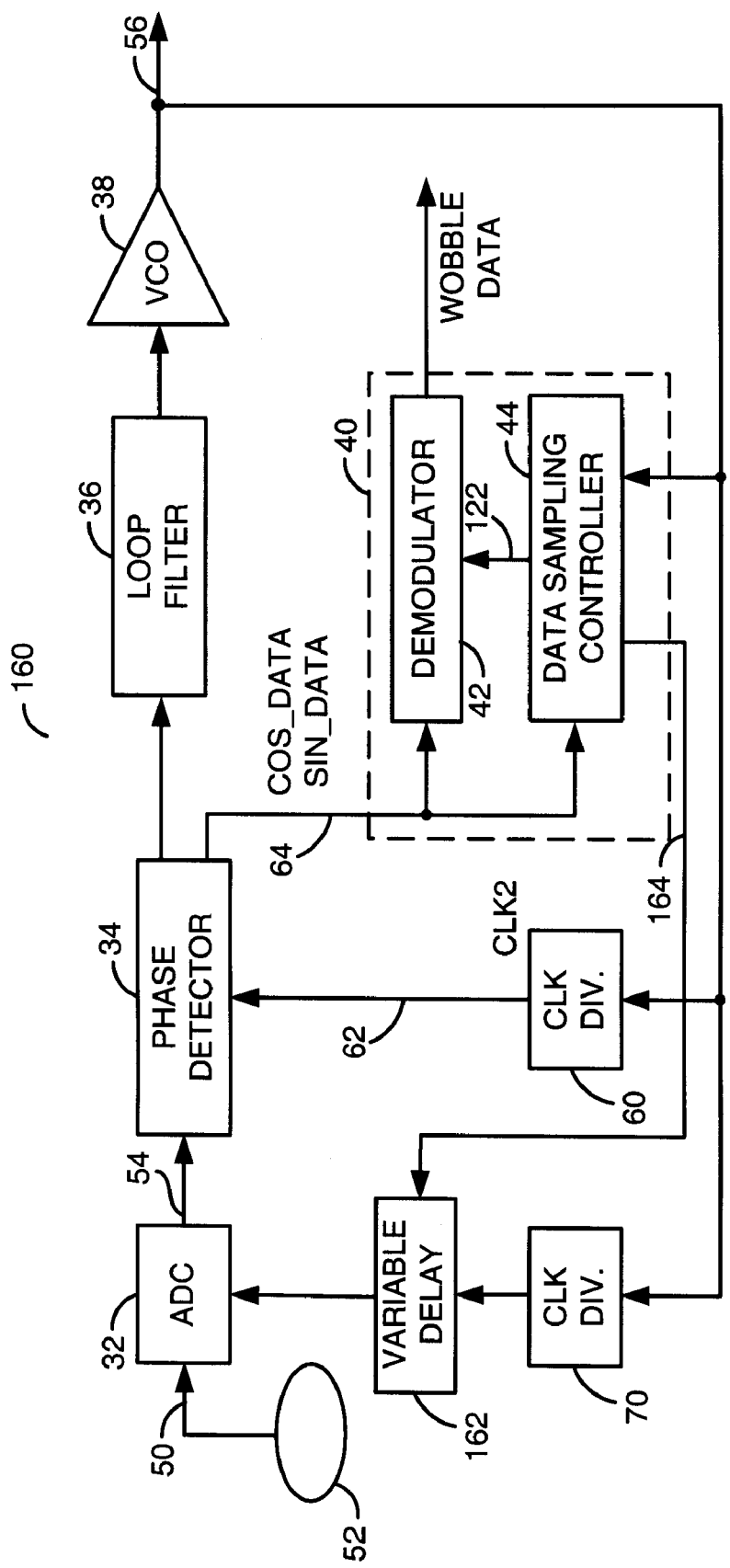
FIG. 11 is a block diagram schematically illustrating a demodulation system in accordance with one embodiment of the present invention.

FIG. 11 schematically illustrates a demodulation system 160 in accordance with one embodiment of the present invention, which monitors a frequency offset, if any, between the wobble data and the underlying wobble and adjusts the PLL by introducing a phase error. The like elements in the demodulation system 160 and the demodulation system 30 bear the like numeral references. As shown in FIG. 11, the demodulation system 160 further includes a delay block 162 which temporally delays or advances the A/D sampling time of the A/D converter 32. In the case where the A/D converter 32 samples every seven (7) cycle of the write clock (VCO output) 56, the A/D sampling may be changed occasionally from every seventh write clock to every sixth or eighth write clock.

For example, the wobble data is slightly slower than the wobble, then more user data bits will be written than that indicated by the passage of wobble data. The output 120 of the error threshold decision block 116 (FIG. 9) will indicate the deviation. The output 120 can be used as an adjustment signal 164 for the A/D converter 32 and the A/D sampling time is advanced one write clock by the delay block 162. This temporal increase of the offset between the wobble and the wobble data does not instantly affect the VCO 38, but has the effect of introducing a small phase error between the VCO 38 output and the wobble signal. This error will force the PLL to slow down to eliminate the introduced phase error and match the wobble signal, reducing the offset between the wobble and the wobble data. The net effect after the adjustment is that the PLL is still in lock with the VCO 38, but one fewer VCO clocks has been issued than otherwise would. This brings the written data back in line with the wobble data. It should be noted that in this adjustment, the demodulator 42 still uses every 98th A/D samples (i.e., the timing/demodulation circuit 40 uses every 49th A/D samples for data sampling and phase monitoring), A/D samples themselves may change occasionally from every seventh write clock to every sixth or eighth write clock, as described above. This A/D sampling adjustment is a fine adjustment since it temporally shift the sampling timing by one write clock cycle, while the window movement it more coarse since it changes the data sampling timing by one A/D sampling, i.e., seven write clock cycles.

Figure 12:
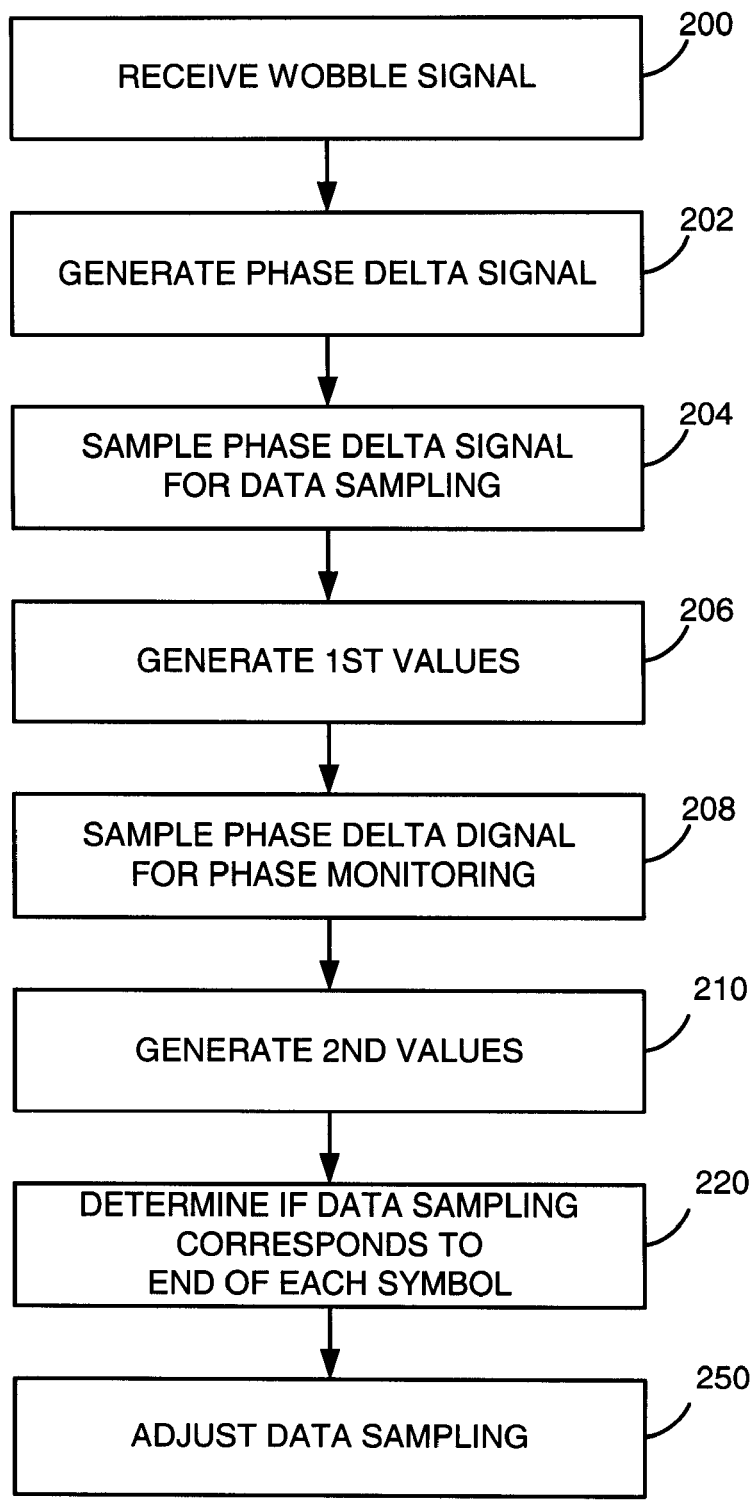
FIG. 12 is a process flow diagram schematically illustrating a method for demodulating pre-formatted information embedded in an optical recording medium, in accordance with one embodiment of the present invention.

FIG. 12 schematically illustrates a method for demodulating pre-formatted information embedded in an optical recording medium, in accordance with one embodiment of the present invention. The method may be performed using the demodulation systems or circuits described above. As shown in FIG. 12, a wobble signal which represents data symbols is received (200). The data symbols are frequency-modulated on a carrier frequency of a pre-formatted pattern of the recording medium such as CD. The wobble signal is typically a digital signal, and may be produced by analog-digital (A/D) sampling, at an A/D sampling interval, an analog wobble signal read from the recording medium.

Then, a phase delta signal representing a phase difference between the wobble signal and a corresponding locked signal having the carrier frequency is generated (202). The phase delta signal is sampled (204) at a data sampling timing with a data sampling interval, so as to produce first values of the phase delta signal (206). The first values are used to demodulate the wobble data. The phase delta signal is also sampled (208) at each halfway of the data sampling interval at a phase monitoring timing, so as to generate second values of the phase delta signal (210). Based on the difference between two successive second values, whether the data sampling 204 is performed at timing corresponding to each end of the data symbols is determined (220), and if the data sampling timing does not corresponds to the end of each data symbol, the data sampling timing is adjusted towards the timing corresponding to the end of each data symbol (250). For example, the sampling timing is advanced or delayed while maintaining the same data sampling interval (window move operation).

Figure 13:
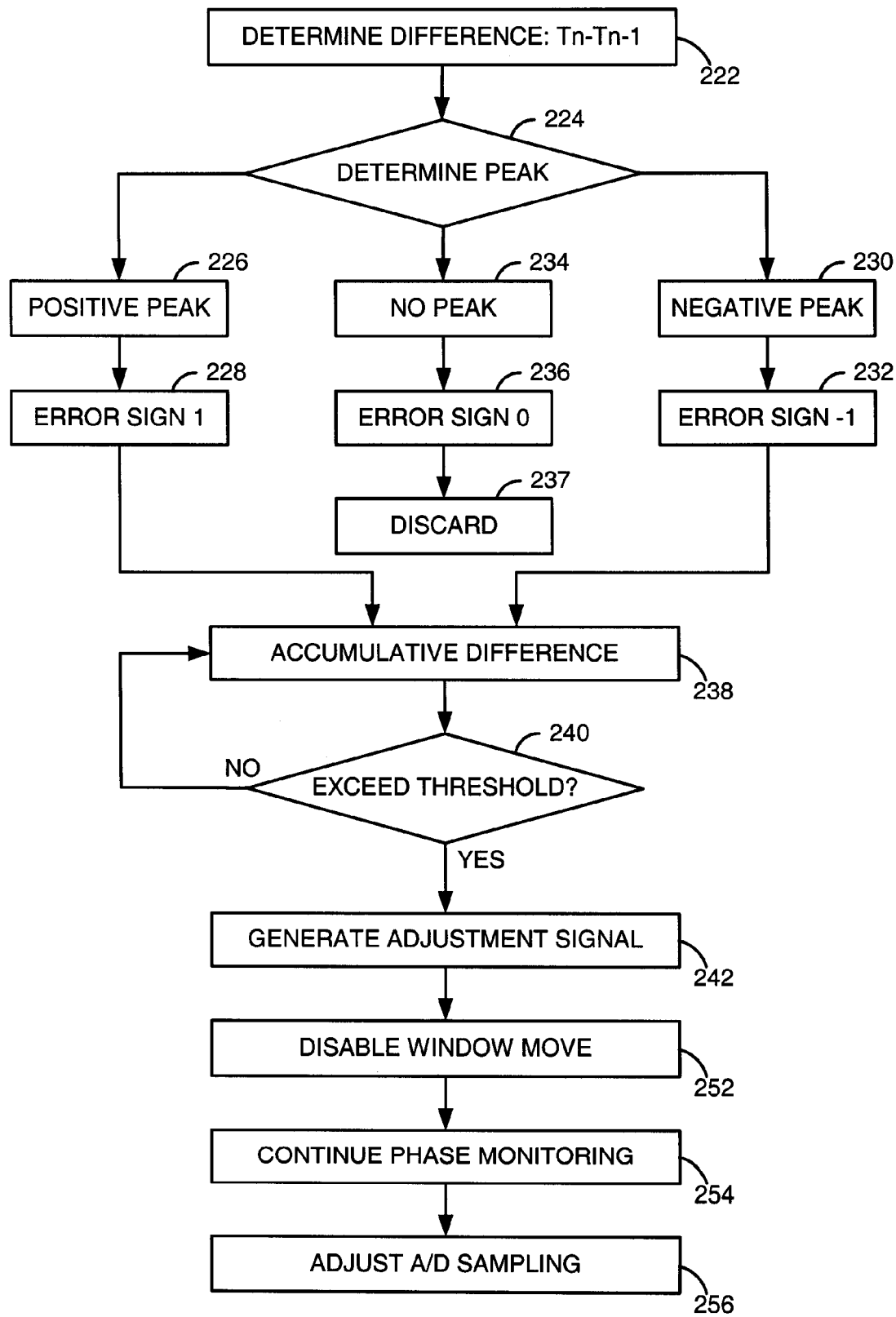
FIG. 13 is a process flow diagram schematically illustrating details of the determination of the timing error and adjustment of the data sampling, in accordance with one embodiment of the present invention.

FIG. 13 schematically illustrates details of the determination of the timing error and adjustment of the data sampling, in accordance with one embodiment of the present invention. In the timing error determination 220, three successive first values $D_{n-1}$, $D_n$, and $D_{n+1}$ and two successive second values $T_{n-1}$ and $T_n$, are used. Based on these first and second values, the difference between a current second value $(T_n)$ and a previous second value $(T_{n-1})$ is calculated (222). Existence of a peak (change in the data symbol) between the two second values $T_{n-1}$ and $T_n$ and the peak type are also determined (224) based on these values. If the phase delta graph (shown in FIG. 6A, for example) has a positive peak (226), a first error sign (for example, +1) is assigned to the difference (228). A positive peak is determined if a first value $(D_{n-1})$ sampled before the previous second value $(T_{n-1})$ and a first value $(D_{n+1})$ sampled after the current second value $(T_n)$ are both smaller than a first value $(D_n)$ sampled between the current second value $(T_n)$ and the previous second value $(T_{n-1})$. If the phase delta graph has a negative peak (230), a second error sign (for example, −1) is assigned to the difference (232). A negative peak is determine if the first value $(D_{n-1})$ sampled before the previous second value $(T_{n-1})$ and the first value $(D_{n+1})$ sampled after the current second value $(T_n)$ are both greater than the first value $(D_n)$ sampled between the current and previous second values $T_n$ and $T_{n-1}$. If the phase delta graph has no peak (234), a third error sign (0) is assigned to the difference (236), No peak exists if the first value $(D_n)$ sampled between the current and previous second values $(T_n$, and $T_{n-1})$ is in between the first value $(D_{n-1})$ sampled before the previous second value $(T_{n-1})$ and the first value $(D_{n+1})$ sampled after the current second value $(T_n)$. That is, the difference $(T_n-T_{n-1})$ is discard (237) since in this case the difference does not indicate any timing error.

The differences assigned with respective error signs are accumulated (238), and if the accumulated value of the differences reaches a predetermined threshold value (240), an adjustment signal is generated (242). For example, if the accumulated value is a positive threshold value, the data sampling timing is delayed while maintaining the same data sampling interval, and if the accumulated value reaches a negative threshold value, the data sampling timing is advanced while maintaining the same data sampling interval. The amount of delay or advance may be by one cycle of an analog/digital (A/D) sampling clock.

After the adjustment, the accumulated value may be reset to zero, and the window move operation may be disabled (252). However, after the window move adjustment, the phase error monitoring 208 through the accumulation 238 may be continued (254). After the window is fixed, the accumulation of the difference indicates a systematic drift of the window, as described above. Thus, if such an accumulated value of the differences reaches the predetermined threshold value, the adjustment signal is used to adjust the A/D sampling interval for one A/D sampling (256) by one cycle of a data write clock. In the case where this optional monitoring detects "too large" an offset between the wobble data and wobble signal, an interrupt may be sent to the host controller (disc driver) so as to abort the write operation and restart at the proper location.

As described above, in accordance with one embodiment of the present invention, after the PLL is locked to the wobble signal, the phase delta between the wobble signal and the carrier signal is not only data-sampled for demodulation, but also monitored by the data sampling controller at a half way of the data sampling interval. During the window move operation, the VCO is phase locked to the wobble signal, and the data sampling time of the modulator is internally adjusted by the data sampling controller. During this window move, the output of the PLL is monitored so as to find the best data sampling time corresponding to the end of each symbol (channel bit), and the data sampling time is moved to this time. After finding an optimal data sampling window, the window move operation may be disabled. However, the phase error monitoring may be continued to ensure the user data is correctly written to the recording medium even if there is a frequency offset between the wobble and the wobble data. During such an optional monitoring and adjustment the window move is frozen, and the A/D sampling for the wobble signal is delayed or advanced as required to adjust the write clock to match the wobble data.

Thus, in accordance with the embodiments of the present invention, using a single PLL, compared with the conventional double-PLL system, CD recordable wobble data is demodulated in the presence of phase and frequency offsets between the wobble data and wobble signal. A loop filter of a PLL includes a capacitor, which either requires a large amount of die space or an external component. Thus, if the capacitor is off-chip, an additional cost for the external component and an additional pin to connect to it are required for the chip. If the capacitor is on-chip, the cost of the die area can be large. Likewise, the die area requirement of the PLL's VCO can be significant. In accordance with the embodiments of the present invention, these two components can be eliminated using some additional digital logic which requires minimal additional cost, so as to reduce the total cost of the chip without loss of functionality. Furthermore, the modulation system can be compatible with recordable DVD formats. The timing loop, with minor programmable modifications, can lock to either DVD+R/RW or DVD-R/RW. This reduces the circuit complexity of a multi-media capability.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

The invention claimed is:

1. A method for demodulating pre-formatted information including a plurality of data symbols embedded in an optical recording medium, said method comprising the steps of:
   first sampling a phase delta signal at a data sampling interval so as to produce first values of the phase delta signal;
   second sampling the phase delta signal at a phase monitoring timing so as to generate second values of the phase delta signal;
   determining, based upon a difference between two successive second values, if said first sampling is performed at a timing corresponding to an end of each data symbol; and
   adjusting sampling timing of said first sampling towards the timing corresponding to the end of each data symbol, if the sampling timing does not correspond to the end of each data symbol.

2. The method according to claim 1, wherein said determining step comprises:
   determining a difference between a current second value and a previous second value;
   assigning a first error sign to the difference if a first value sampled before the previous second value and a first value sampled after the current second value are both smaller than a first value sampled between the current second value and the previous second value;
   assigning a second error sign to the difference if the first value sampled before the previous second value and the first value sampled after the current second value are both greater than the first value sampled between the current and previous second values;
   assigning a third error sign to the difference if the first value sampled between the current and previous second values is in between the first value sampled before the previous second value and the first value sampled after the current second value; and
   accumulating the differences with respective assigned error signs.

3. The method according to claim 2, further comprising:
   generating an adjustment signal in response to an accumulated value of the differences reaching a predetermined threshold value.

4. The method according to claim 3, wherein said adjusting step comprises:
   delaying the sampling timing, while maintaining the same data sampling interval, if the accumulated value reaches a positive threshold value;
   advancing the sampling timing, while maintaining the same data sampling interval, if the accumulated value reaches a negative threshold value; and
   resetting the accumulated value to zero.

5. The method according to claim 4, wherein the sampling timing is adjusted by one cycle of an analog/digital (A/D) sampling clock.

6. The method according to claim 2, further comprising:
   generating said phase delta signal representing a phase difference between a wobble signal and a corresponding locked signal having a carrier frequency of a pre-formatted pattern of the recording medium, wherein the wobble signal represents data symbols which are frequency-modulated on the carrier frequency.

7. The method according to claim 6, further comprising:
   analog-digital (A/D) sampling, at an A/D sampling interval, an analog wobble signal read from the recording medium so as to produce the wobble signal.

8. The method according to claim 7, further comprising, after said adjusting:
   continuing said second sampling, said determining the difference, and said assigning the first, second and the third error signs; and
   adjusting the A/D sampling interval for one A/D sampling if a second accumulated value of the differences reaches the predetermined threshold value.

9. The method according to claim 8, wherein the A/D sampling interval is adjusted by one cycle of a data write clock.

10. The method according to claim 6, wherein the wobble signal comprises a modulated first data symbol having a first frequency greater than the carrier frequency and a modulated second data symbol having a second frequency smaller than the carrier frequency.

11. The method according to claim 1, wherein said second sampling occurs at phase monitoring points that are halfway between the corresponding data sampling points.

12. The method according to claim 1, wherein said adjusting step includes:
   advancing or delaying the data sampling timing while maintaining the same data sampling interval.

13. The method according to claim 1, wherein the data symbols encode timing and position information for writing user data onto the recording medium.

14. A timing/demodulation circuit for demodulating a wobble signal representing a plurality of data symbols embedded in an optical recording medium, the data symbols being frequency-modulated on a carrier frequency of a pre-formatted pattern of the recording medium, said timing/demodulation circuit comprising:
   a demodulator configured to receive a phase delta signal representing a phase difference between the wobble signal and a corresponding locked signal having the carrier frequency, the demodulator sampling the phase delta signal at a data sampling interval so as to generate first values of the phase delta signal, the first values being output as a data signal; and a data sampling controller configured to (i) receive the phase delta signal, (ii) sample the phase delta signal at a phase monitoring timing so as to generate second values of the phase delta signal, (iii) determine, based on a difference between two successive second values, if the sampling of the phase delta signal by the demodulator is performed at timing corresponding to an end of each data symbol and (iv) adjust timing of the sampling by the demodulator towards the timing corresponding to the end of each data symbol, if the sampling by the demodulator is not performed at timing corresponding to the end of each data symbol.

15. The circuit according to claim 14, wherein the wobble signal comprises a modulated first data symbol having a first frequency greater than the carrier frequency and a modulated second data symbol having a second frequency smaller than the carrier frequency.

16. The circuit according to claim 14, wherein the data symbols encode timing and position information for writing user data onto the recording medium.

17. A demodulation system for demodulating a wobble signal representing a plurality of data symbols embedded in an optical recording medium, the data symbols being frequency-modulated on a carrier frequency of a pre-formatted pattern of the recording medium, said demodulation system comprising:
  an analog-to-digital (A/D) converter adapted to sample, at an A/D sampling interval, an analog wobble signal read from the recording medium so as to generate the wobble signal;
  a phase detector coupled to said A/D converter, said phase detector generating a phase delta signal representing a phase difference between the wobble signal and a corresponding locked signal having the carrier frequency;
  a loop filter coupled to said phase detector;
  a voltage-controlled oscillator (VCO) coupled to said loop filter, said VCO generating a locked write clock;
  a demodulator coupled to said phase detector, the demodulator sampling the phase delta signal at a data sampling interval in accordance with a data sampling clock so as to generate first values of the phase delta signal, the first values being output as a data signal; and
  a data sampling controller coupled to said phase detector and the demodulator, the data sampling controller configured to (i) receive the phase delta signal, (ii) sample the phase delta signal at a phase monitoring timing so as to generate second values of the phase delta signal, (iii) determine, based on a difference between two successive second values, if the sampling of the phase delta signal by the demodulator is performed at timing corresponding to an end of each data symbol and (iv) adjust timing of the sampling by the demodulator towards the timing corresponding to the end of each data symbol, if the sampling by the demodulator is not performed at timing corresponding to the end of each data symbol.

18. The demodulation system according to claim 17, wherein the wobble signal comprises a modulated first data symbol having a first frequency greater than the carrier frequency and a modulated second data symbol having a second frequency smaller than the carrier frequency.

19. The demodulation system according to claim 18, wherein the data symbols encode timing and position information for writing user data onto the recording medium.

20. The demodulation system according to claim 17, wherein said second sampling occurs at phase monitoring points that are halfway between the corresponding data sampling points.

* * * * *